(12) United States Patent
Sassatelli et al.

(10) Patent No.: US 7,681,325 B2
(45) Date of Patent: Mar. 23, 2010

(54) APPARATUS FOR MEASURING A TURBINE BLADE

(75) Inventors: John Sassatelli, Valley Falls, NY (US); Mark McPhilmy, Burnt Hills, NY (US); Timothy McMurray, Rotterdam Jct., NY (US); Eloy Emeterio, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 659 days.

(21) Appl. No.: 11/591,708

(22) Filed: Nov. 2, 2006

(65) Prior Publication Data

US 2008/0203235 A1 Aug. 28, 2008

(51) Int. Cl.
*G01B 5/00* (2006.01)
*G01B 3/18* (2006.01)

(52) U.S. Cl. .............................. 33/784; 33/783; 33/794; 33/810; 33/819

(58) Field of Classification Search ........... 33/783–784, 33/791–795, 797, 806–807, 810–812, 819, 33/823
See application file for complete search history.

(56) References Cited

U.S. PATENT DOCUMENTS

| | | | | | |
|---|---|---|---|---|---|
| 2,799,942 | A | * | 7/1957 | Ehler | 33/810 |
| 3,309,775 | A | * | 3/1967 | Vieregge | 33/810 |
| 3,845,559 | A | * | 11/1974 | Offer | 33/810 |
| 4,216,584 | A | * | 8/1980 | Meissner et al. | 33/784 |
| 5,022,162 | A | * | 6/1991 | Luikko | 33/784 |
| 5,148,612 | A | * | 9/1992 | Walser et al. | 33/784 |
| 5,490,335 | A | * | 2/1996 | Chu | 33/810 |
| 5,574,381 | A | * | 11/1996 | Andermo et al. | 33/705 |
| 5,722,179 | A | * | 3/1998 | Zanier | 33/811 |
| 6,105,269 | A | * | 8/2000 | Kondrat | 33/784 |
| 6,279,248 | B1 | * | 8/2001 | Walters | 33/784 |
| RE37,490 | E | * | 1/2002 | Andermo et al. | 33/810 |
| 6,467,183 | B2 | * | 10/2002 | Larsen | 33/810 |
| 6,594,915 | B2 | * | 7/2003 | Matsumiya et al. | 33/783 |
| 6,990,746 | B2 | * | 1/2006 | Penna et al. | 33/784 |
| 7,076,886 | B2 | * | 7/2006 | John et al. | 33/784 |
| 7,475,493 | B2 | * | 1/2009 | Haglof | 33/784 |
| 7,533,474 | B2 | * | 5/2009 | Saito et al. | 33/811 |
| 2001/0013179 | A1 | * | 8/2001 | Larsen | 33/810 |
| 2002/0100183 | A1 | * | 8/2002 | Matsumiya et al. | 33/783 |
| 2008/0229603 | A1 | * | 9/2008 | King et al. | 33/783 |

* cited by examiner

*Primary Examiner*—Yaritza Guadalupe-McCall
(74) *Attorney, Agent, or Firm*—Mark E. Henderson; Ernest G. Cusick; Frank A. Landgraff

(57) ABSTRACT

An erosion gauge for measuring a chord length of an eroded turbine blade in a steam turbine that may include: a jaw that includes a lower jaw that includes a lower jaw surface and an upper jaw that includes an upper jaw surface such that the lower jaw surface and the upper jaw surface oppose each other; a sliding scale that connects the lower jaw to the upper jaw, wherein a first end of the sliding scale is fixed to the lower jaw and a second end of the sliding scale slides through the upper jaw such that the distance between the lower jaw surface and the upper jaw surface may be varied; and an electronic depth gauge that determines the distance between the lower jaw surface and the upper jaw surface. The lower jaw surface may include a valley insert.

20 Claims, 4 Drawing Sheets

APPARATUS FOR MEASURING A TURBINE BLADE

TECHNICAL FIELD

This present application relates generally to an apparatus for measuring a turbine blade or similar apparatus. More specifically, but not by way of limitation, the present application relates to an apparatus for measuring the amount of erosion a turbine blade has sustained by accurately measuring the chord length of the turbine blade.

BACKGROUND OF THE INVENTION

During operation, turbine blades, particularly the last stage turbine blades in a steam turbine, experience water droplet erosion due to their location in the steam path. Over time, this erosion produces a jagged edge along the leading edge of the turbine blade. The jagged edge, in turn, acts as a notch, producing local stress concentrations in the eroded leading edge. As the erosion increases, the notches grow deeper in and become more pronounced, i.e., the differential between the low and high spots of the jagged edge become greater. This results in increased stress concentrations and, ultimately, may cause a failure in the turbine blade. In extreme cases, if the correct loading and eroding conditions coexist, the entire tip of the turbine blade may break free, which will cause significant damage to the turbine.

As a result, there is a need for an efficient and reliable manner to track and quantify the erosion of steam turbine blades, especially those in the last stage of a steam turbine. In general, the erosion of a set of turbine blades (i.e., the turbine blades within single stage of the turbine) may be tracked by periodically recording the chord length measurements of each of the turbine blades within a turbine blade set. As used herein and as one of ordinary skill in the art will appreciate the chord length of a turbine blade generally may be defined as the width of the airfoil of the turbine blade. More specifically, but not by way of limitation, chord length may be defined as the linear distance from the leading to the trailing edge on the suction side of the airfoil of the turbine blade. From the chord length measurements, the erosion may quantified and, based on the quantification, decisions may be made regarding when replacement of a turbine blade or a set of turbine blades is needed.

However, the constraints related to taking the necessary measurements of the turbine blade chord length are considerable. First, in general, downtime for turbine power generators is limited, which means there is limited opportunity to take the necessary measurements. As a result, the necessary chord length measurements must be able to be taken during a relatively short time period. This issue is exacerbated by the number of turbine blade measurements required to accurately ascertain the erosion level of a set of turbine blades. A turbine has multiple stages, and each turbine stage often contains between 80-100 turbine blades. Further, multiple measurements (approximately 10-20 separate measurements) are required along the length of each turbine blade to accurately quantify and describe its overall erosion level.

Second, because disassembling the turbine would be too time consuming and costly, the measurements must be taken with the turbine in the assembled condition, i.e., with the turbine blades assembled on the rotor within the turbine. Access to the assembled turbine blades to take the necessary measurements is difficult and limited. Any device used to take the necessary measurements must be able to fit between the turbine blades in their assembled condition. Further, in general, access to the assembled blades only occurs from an opening that allows a person to enter the turbine unit from a downstream location. As such, the person taking the measurements has direct access only to the downstream faces of the turbine blades. Thus, any device used to take the necessary measurements must be portable so that an operator may carry it into the turbine and be able to be used by an operator who has access to the assembled turbine blades from only a downstream location.

In general, chord length measurements are taken often (approximately every 6 to 18 months) so that information regarding the erosion level is as up-to-date and accurate as possible. However, current processes for obtaining the measurements are lengthy, inefficient and result in wasted man-hours and increased downtime to the turbine unit. Further, current devices and methods do not yield accurate or reliable data. Therefore, there is a need for a device that provides accurate and reliable turbine blade measurements in a time efficient manner.

BRIEF DESCRIPTION OF THE INVENTION

The present application thus describes an apparatus for taking measurements that may include: a jaw that includes a lower jaw that includes a lower jaw surface and an upper jaw that includes an upper jaw surface such that the lower jaw surface and the upper jaw surface oppose each other; means for varying the. distance between the lower jaw surface and the upper jaw surface; and means for. determining the distance between the lower jaw surface and the upper jaw surface. The lower jaw surface may include a valley insert. The apparatus may be sized to take measurements of a chord length of an installed turbine blade in a steam turbine.

In some embodiments, the means for varying the distance between the lower jaw surface and the upper jaw surface may include a sliding scale that connects the lower jaw to the upper jaw. A first end of the sliding scale may fixed to the lower jaw and a second end of the sliding scale may slide through the upper jaw such that the distance between the lower jaw surface and the upper jaw surface may be varied. The means for determining the distance between the lower jaw surface and the upper jaw surface may include an electronic depth gauge. The electronic depth gauge may be attached to the upper jaw. The sliding scale also may slide through the electronic depth gauge. The electronic depth gauge may determine the distance between the lower jaw surface and the upper jaw surface by monitoring the movement of the sliding scale as the sliding scale slides through the electronic depth gauge.

The electronic depth gauge further may include a display for displaying information including the measured distance between the lower jaw surface and the upper jaw surface. The display may be positioned on the opposite side of the apparatus as the valley insert such that when the lower jaw is inserted between two assembled turbine blades from a downstream location in a turbine and the valley insert is inserted into an erosion valley on the leading edge of the turbine blade for the purpose of obtaining a measurement, an operator of the apparatus is able to see the measurement reading on the display.

The upper jaw surface may be substantially flat, substantially perpendicular to the sliding scale, and forms a shelf that is able to engage a trailing edge or leading edge of the turbine blade during the measurement of a chord length of the turbine blade. The valley insert may include a narrow point. The valley insert may be oriented such that the point points substantially toward the upper jaw surface. The valley insert may include a wedge valley insert. In some embodiments, the wedge valley insert may include a wedge shaped piece that substantially narrows to the point. The shape and size of the wedge shaped piece may be the approximate shape and size of erosion valleys that occur on an eroded leading edge of a turbine blade in a steam turbine. In other embodiments, the valley insert may include a pin valley insert. The pin valley insert may include a long narrow pin piece that substantially narrows to the point.

The apparatus may further include a zeroing standard. The zeroing standard may be a length of rigid material of a known length. The known length may correspond to the chord length of a turbine blade that has not experienced any erosion such that the zeroing standard may be placed between the upper jaw surface and the lower jaw surface for the purpose of zeroing the apparatus to the known length. The lower jaw surface further may include a flat surface that opposes the flat surface of the upper jaw surface. The flat surface of the lower jaw surface may form a shelf that is able to engage the zeroing standard during the zeroing of the apparatus. The flat surface of the lower jaw surface may align vertically with the point of the valley insert.

In some embodiments, the point of the valley insert may align horizontally with a side of the sliding scale. The apparatus may further include wings. The wings may be extensions that extend outward from opposite sides of the upper jaw. A lower edge of each of the wings is substantially perpendicular to the sliding scale. In some embodiments, the means for determining the distance between the lower jaw surface and the upper jaw surface may include a plurality of markings positioned at regular intervals one of the sides of the sliding scale such that the alignment of the markings in relation to the upper jaw indicate the distance between the lower jaw surface and the upper jaw surface. The lower jaw and sliding scale may include a thin profile such that the lower jaw and sliding scale may be inserted between assembled turbine blades.

The present application further describes an erosion gauge for measuring a chord length of an eroded turbine blade in a steam turbine that may include: a jaw that includes a lower jaw that includes a lower jaw surface and an upper jaw that includes an upper jaw surface such that the lower jaw surf ad the upper jaw surface oppose each other; a sliding scale that connects the lower jaw to the upper jaw, wherein a first end of the sliding scale is fixed to the lower jaw and a second end of the sliding scale slides through the upper jaw such that the distance between the lower jaw surface and the upper jaw surface may be varied; and an electronic depth gauge that determines the distance between the lower jaw surface and the upper jaw surface. The lower jaw surface may include a valley insert. The valley insert may include a narrow point. The valley insert may be oriented such that the point points substantially toward the upper jaw surface. In some embodiments, the valley insert may include a wedge valley insert. The wedge valley insert may include a wedge shaped piece that substantially narrows to the point.

These and other features of the present application will become apparent upon review of the following detailed description of the preferred embodiments when taken in conjunction with the drawings and the appended claims.

DETAILED DESCRIPTION OF THE INVENTION

Figure 1:
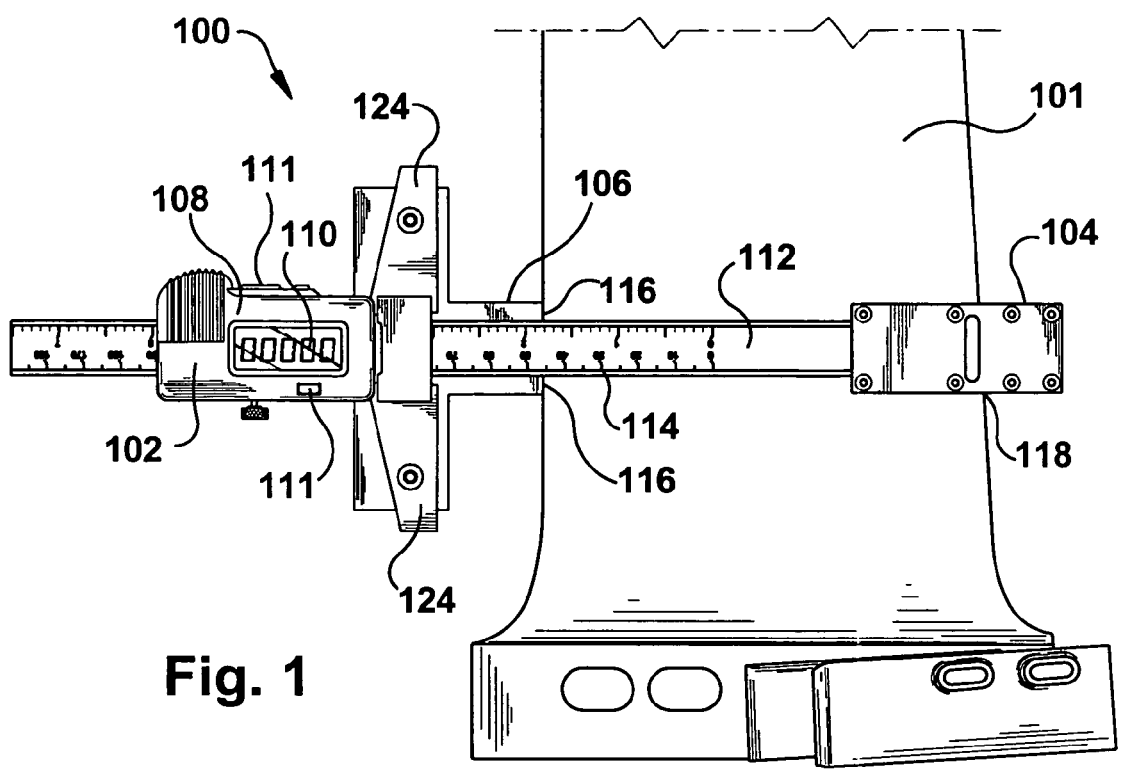
FIG. 1 is a top view of an erosion gauge according to an exemplary embodiment of the present application, wherein the erosion gauge is aligned against the discharge side of an exemplary turbine blade.

Referring now to the figures, where the various numbers represent like parts throughout the several views, FIG. 1 illustrates a top view of an erosion gauge 100 according to an exemplary embodiment of the present application. As shown, the erosion gauge 100 is aligned against a turbine blade 101 such that the erosion gauge 100 may take a measurement of the chord length of the turbine blade 101. (Note that the present invention is discussed primarily in relation to taking measurements of eroded turbine blades. As one of ordinary skill in the art would appreciate, the present invention is not so limited and may be used to take other similar types of measurements.) The erosion gauge 100 may include a digital readout scale or an electronic depth gauge 102, which may measure the distance between a lower jaw 104 and an upper jaw 106. In other embodiments, a dial gage or DRO scale may be used. The electronic depth gauge 102 may include an interface 108 with a display 110 for displaying measurement readings and other information relating to the operation of the erosion gauge 100. The interface 108 also may include one or more buttons 111 for controlling certain functions, such as setting the electronic depth gauge 100 to record a new measurement or for "zeroing" the device. In some embodiments, the electronic depth gauge 102 may be a digital depth gauge manufactured by Mitutoyo. Other commercially available electronic depth gauges also may be used.

The electronic depth gauge 102 may be attached to the upper jaw 106. The lower jaw 104 may be attached to the upper jaw 106 by a sliding scale 112. The sliding scale 112 may have a rectangular face and have a thin, flat profile, much like the shape of a ruler. The sliding scale 112 may be fixed to the lower jaw 104 and may slide through the upper jaw 106 and the electronic depth gauge 102. The end of the sliding scale 112 that is opposite to the end attached to the lower jaw 104 may have a stop (not shown) that may "catch" at a fully extended position (i.e., when the lower jaw 104 and the upper jaw 106 are fully extended apart) such that lower jaw 104 the upper jaw 106 remain connected by the sliding scale and, thus, do not slide apart. In a fully extended position, the upper jaw 106 and the lower jaw 104 may be approximately 8 inches apart, though this distance may vary in different embodiments. The electronic depth gauge 102 may measure the distance between the lower jaw 104 and the upper jaw 106 by monitoring the movement of the sliding scale 112 as it slides through the electronic depth gauge 102. In addition, a plurality of markings 114 (such as ruler markings) may be positioned at regular intervals along either side or both of the sliding scale 112. The markings 114 may be arranged to allow measurements to be taken visually (i.e., without the use of the electronic depth gauge 102). Those of ordinary skill in the art will appreciate that systems other than those described above may be used to measure the distance between the lower jaw 104 and the upper jaw 106.

The upper jaw 106 may have a flat edge 116 that may be laid against another flat surface such that it engages the other flat surface when the erosion gauge 100 is taking a measurement. The flat edge 116 of the upper jaw 106 may protrude slightly outward from the erosion gauge 101 such that it forms a shelf. The lower jaw 104 also may have a flat edge 118 that opposes the flat edge 116 of the upper jaw 106 and that may be laid against another flat surface such that it engages the other flat surface when the erosion gauge 100 is taking a measurement. (Note that the flat edge 118 of the lower jaw 104 generally is used only in zeroing the erosion gauge 100 before taking erosion measurements, as will be described in more detail below.) The flat edge 118 of the lower jaw 104 also may protrude slightly outward from the erosion gauge 101 such that it forms a shelf. The flat edge 116 of the upper jaw 106 and the flat edge 118 of the lower jaw 104 each may be seen in more detail in FIG. 2, which is a bottom view of the erosion gauge 100 aligned against the turbine blade 101. The flat edge 116 of the upper jaw 106 and the flat edge 118 of the lower jaw 104 each may be substantially perpendicular to the sliding scale 112. As shown from an upstream perspective in the turbine, FIG. 2 illustrates the erosion gauge 100 aligned against the discharge (i.e., downstream) side of the turbine blade 101 such that the erosion gauge 100 may take a measurement of the chord length of the turbine blade 101.

Figure 2:
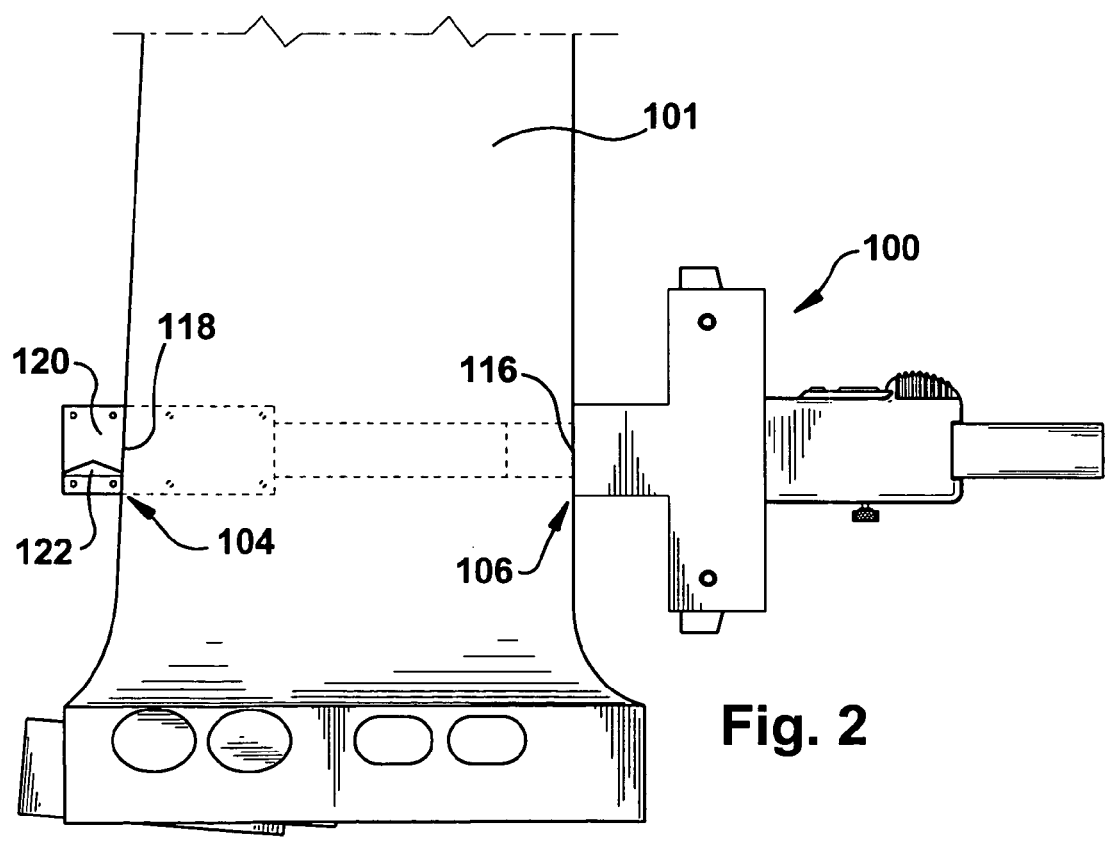
FIG. 2 is a bottom view of an erosion gauge according to an exemplary embodiment of the present application, wherein the erosion gauge is aligned against an exemplary turbine blade viewed from the admission side.

As further illustrated in FIG. 2, the flat edge 118 of the lower jaw 104 is the upper edge of a lower jaw face 120. The lower jaw face 120 may be rectangular in nature and attach to the sliding scale 112. The lower jaw 104 further may have a valley insert 122. The valley insert 122 may extend outward from the lower jaw face 120. The valley insert 122 may be wedge shaped (as shown), pin shaped, or another similar configuration. Vertically, the top of the valley insert 122, which may be the point of the wedge or pin shaped piece, may line up with the flat edge 118 of the lower jaw 104. Horizontally, the point of the valley insert 122 may line up with one of the edges of the sliding scale 112. Though not shown in FIG. 1 or 2, the valley insert 122 may be used to accurately measure the chord length of a turbine blade 101 with a ragged and eroded leading edge, the method of which will be described in more detail below.

The erosion gauge 100 further may include wings 124. The wings 124 may extend outward from opposite sides of the upper jaw 106. In some embodiments, the lower edge of each of the wings 124 may be substantially perpendicular to the sliding scale 112. As described in more detail below, during use, the wings 124 may allow the operator of the erosion gauge 100 a visually check to ensure the sliding scale 112 is substantially perpendicular to the turbine blade 101 during the measurement of the turbine blade 101. More specifically, if the lower edges of the wing 124 are substantially parallel to the trailing edge of the turbine blade 101, the sliding scale 112 will be substantially perpendicular to the turbine blade 101 and in the appropriate position to take an accurate measurement of the chord length. Further, the wings 124 may allow for a useful operator gripping location on the erosion gauge 100 while measurements are being taken. The component parts of the erosion gauge 100 may be constructed with known materials, such as metal (aluminum or stainless steel) and/or plastic. The component parts may be assembled together using conventional methods.

Figure 3:
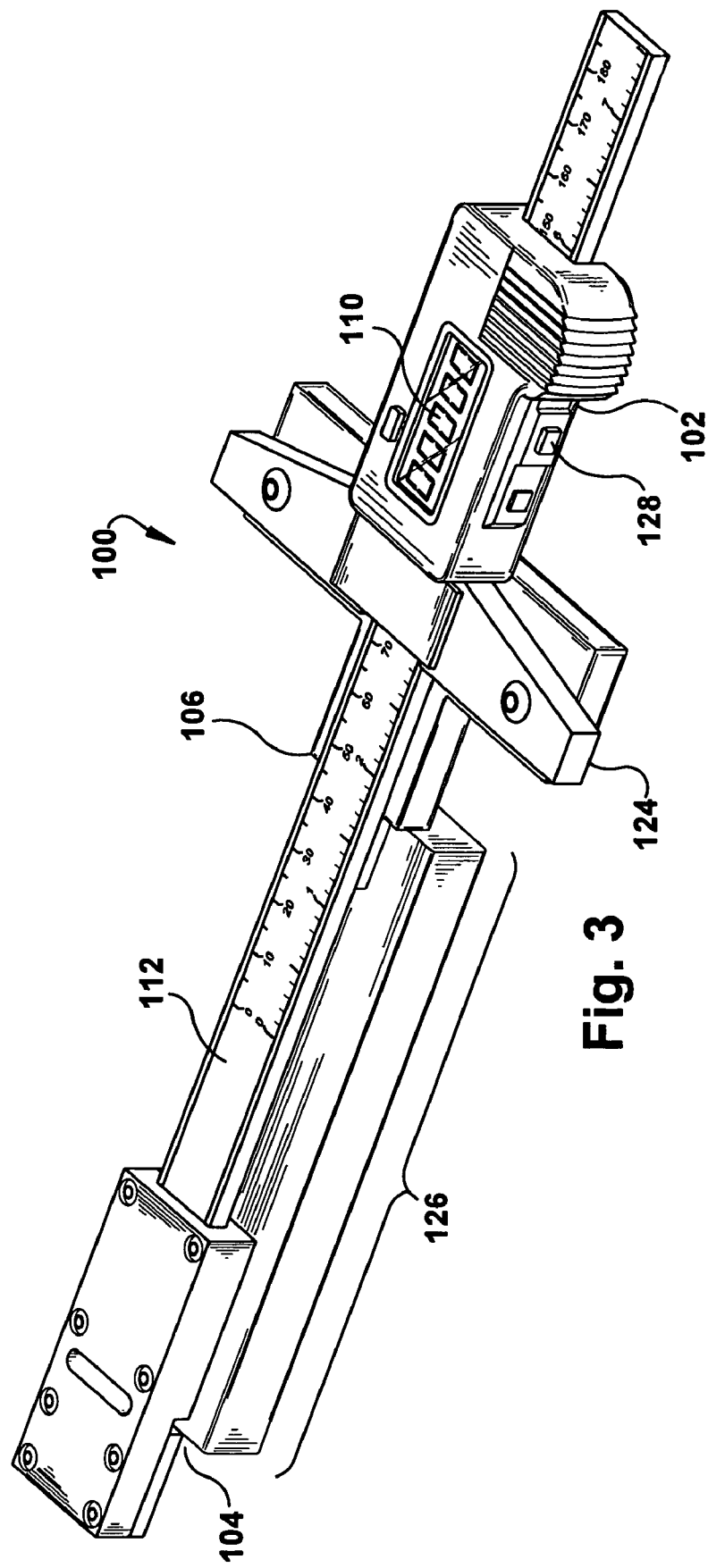
FIG. 3 is a view of an erosion gauge and a zeroing standard according to an exemplary embodiment of the present application.

As illustrated in FIG. 3, the erosion gauge 101 further may include a zeroing standard 126. As discussed in more detail below, the zeroing standard 126 may be a length of rectangular shaped material of known length. The zeroing standard 126 may have flat surfaces at each end and may be used in zeroing the erosion gauge 101 before use.

In operation, the erosion gauge 100 may be used to take accurate and reliable measurements of the chord length of a turbine blade so that erosion level of a set of turbine blades may be efficiently determined during the limited downtime of a turbine engine. In some embodiments of the present application, before use, the erosion gauge 100 may be zeroed. To zero the device, the zeroing standard 126 may be placed between the flat edge 116 of the upper jaw 106 and the flat edge 118 of the lower jaw 104, as illustrated in FIG. 3. When this is complete, a zeroing button 128 may be pressed and held until the display 110 shows "0.0000". The length of the zeroing standard 126 may coincide with the chord length of a turbine blade that has not experienced any erosion. Accordingly, after zeroing the erosion gauge 100 measured deviations from the "0.0000" value may reflect the effects of erosion on the turbine blade. In some embodiments, the length of the zeroing standard 126 may be 5 inches. Those of ordinary skill in the art will appreciate that other embodiments of the present application may be formatted such that zeroing is not required.

After zeroing the device, an operator may use the erosion gauge 100 to take a measurement of an installed turbine blade. As stated, in general, access to the assembled turbine blades occurs only from an opening that allows an operator to enter the turbine unit from a downstream location. From this access point an operator may conveniently carry the erosion gauge 100 into the turbine.

Figure 4:
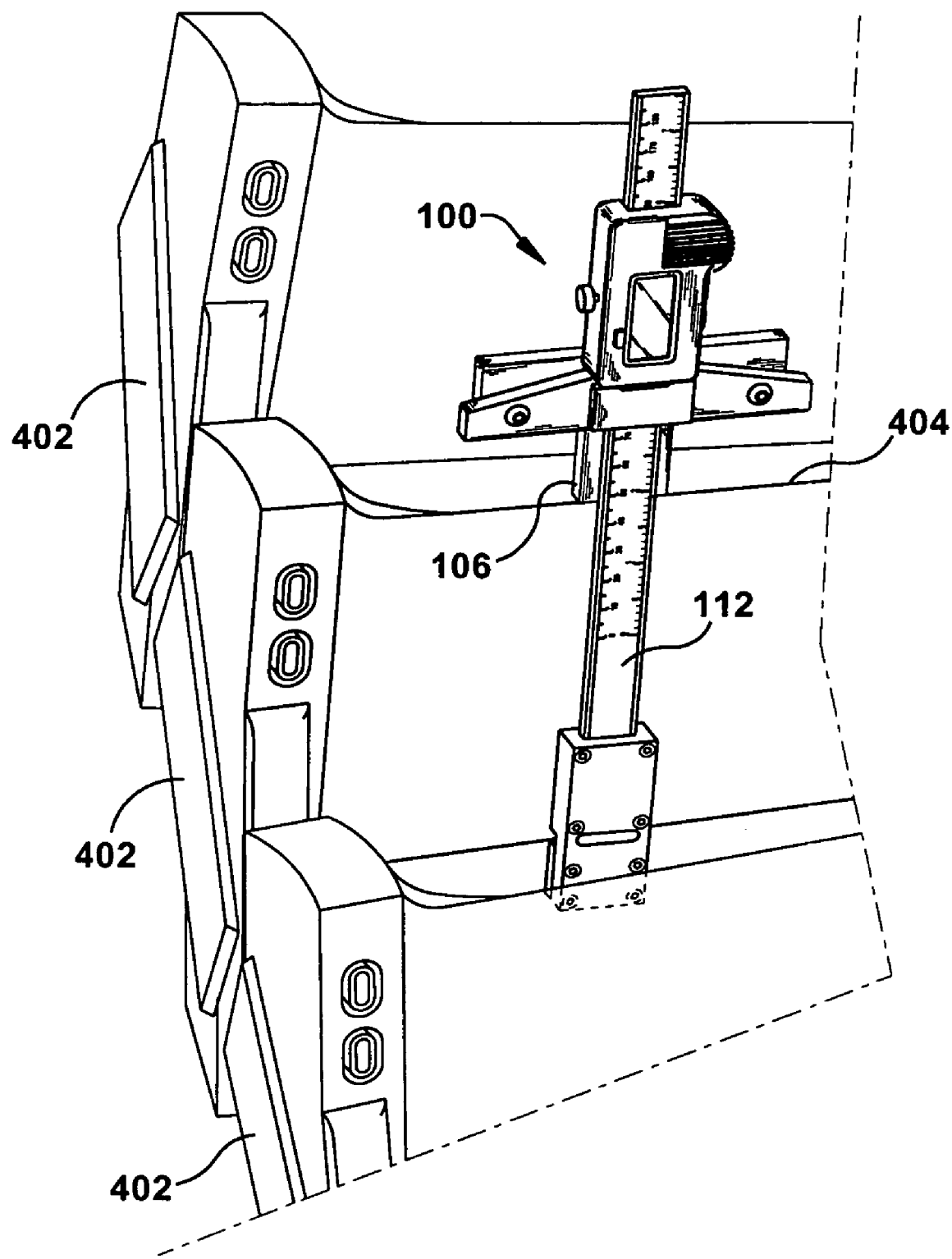
FIG. 4 is a view of an erosion gauge according to the present application taking a chord length measurement of an exemplary turbine blade.

FIG. 4 shows the discharge side (i.e., the downstream side) of the two assembled turbine blades 402. The configuration of the erosion gauge 100 may allow measurements to be taken with access to only the downstream faces of assembled turbine blades 402. (Note that the erosion gauge 100 is not limited to taking measurements from a downstream access point and also may be used to take measurements from an upstream location.) As further illustrated in FIG. 4, there is limited space between assembled turbine blades 402 for the chord length measurements to be taken. However, the configuration of the erosion gauge 100 (i.e., its thin profile) may allow it to be inserted between the blades 402 and positioned so that measurements may be taken. Further, the positioning of the interface 108 (and the display 110 thereon) may allow the operator to see the displayed measurement as the measurement is being taken so that the operator may efficiently record it. In some embodiments, the measurements may be digitally recorded by the electronic depth gauge 102 such that the measurements may be reviewed later or downloaded to a computer spreadsheet for analysis.

To take a chord length measurement, the operator may insert the lower jaw 104 of the erosion gauge 100 between the turbine blades 402. The operator may be facing the discharge side of the turbine blades from a downstream location. In this position, the lower jaw 104 may slide in between the turbine blades 402 toward the leading edge of the turbine blade 402 (which is somewhat obscured in FIG. 4 by the second turbine blade 402). The operator then may place the flat edge 116 of the upper jaw 106 on the flat edge of the trailing edge 404 of the turbine blade 402. Because, as stated, the flat edge 116 of the upper jaw 106 is substantially perpendicular to the sliding scale 112, this positioning will ensure that the sliding scale 112 is perpendicular to the turbine blade 402, which is, the proper position for an accurate chord length measurement to be taken. Thus, having the flat edge 116 of the upper jaw 106 pressed against the flat trailing edge 404 of the turbine blade 402, ensures that the sliding scale 112 is in the proper measurement position.

Figure 5:
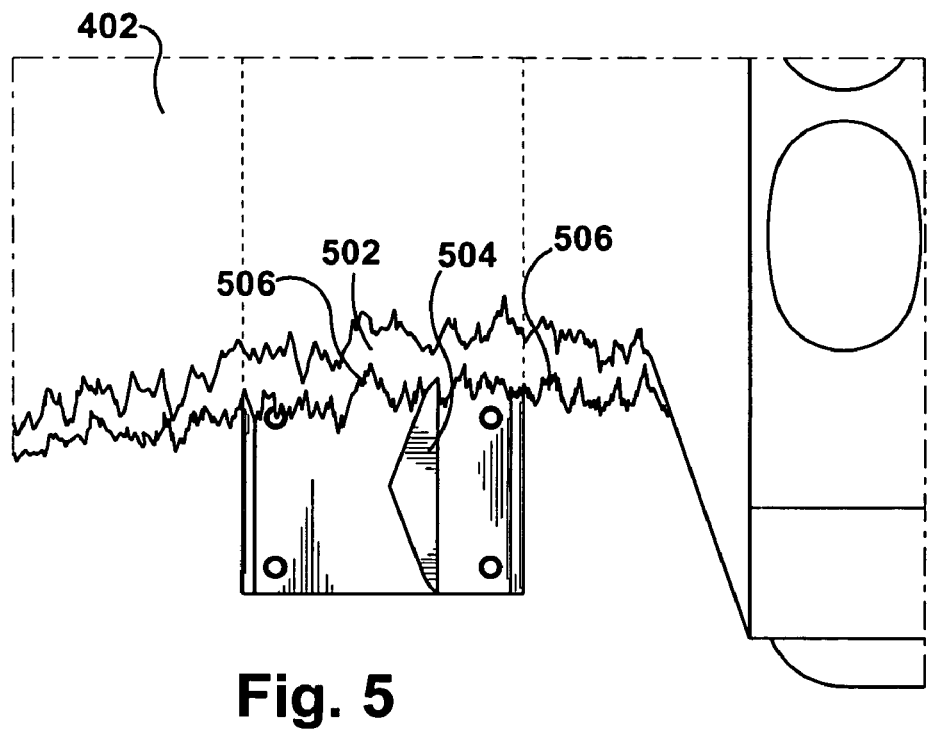
FIG. 5 is a view of a wedge valley insert according to an exemplary embodiment of the present application seated in an erosion valley or pit of an eroded leading edge of a turbine blade as a turbine blade chord length measurement is taken.
Figure 6:
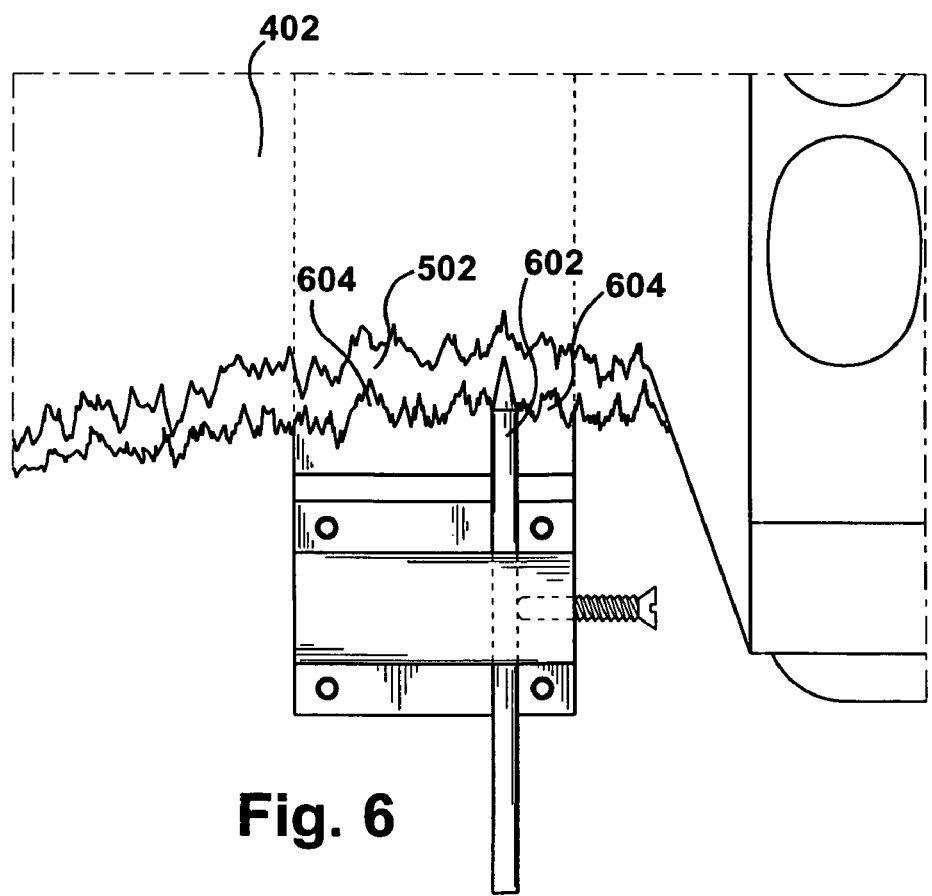
FIG. 6 is a view of a pin valley insert according to an exemplary embodiment of the present application seated in an erosion valley or pit of an eroded leading edge of a turbine blade as a turbine blade chord length measurement is taken.

The operator then may position the lower jaw 104 by sliding it outward to the leading edge of the turbine blade 402 so that the chord length measurement may be taken. As illustrated in FIG. 5 and 6 (which are a close-up pictures of a jagged, eroded leading edge 502 of turbine blade 402), the operator may find the leading edge 502 with the valley insert 122. As shown in FIG. 5, the valley input may be a wedge valley insert 504. As shown in FIG. 6, the valley input may be a pin valley insert 602. In either case, the valley insert 122 may include a narrow point (or, in some cases, a piece that narrows to a point) that fits within the narrow valleys and pits of a jagged, eroded leading edge 502 of a turbine blade 402. Those of ordinary skill will appreciate that other similar configurations of the valley insert 122 may be used. The operator then may manipulate the valley insert 122 such that it becomes "seated" in one of the erosion valleys or pits 506, 604 and record the measurement displayed on the display 110. The configuration of the erosion gauge 100 allows this action to be essentially completed by "feel," which is efficient because, as illustrated in FIG. 4, the leading edge of the turbine blade is obscured by the neighboring turbine blade. In this manner, a more accurate measurement of the chord length of the turbine blade 402, i.e., a measurement that better takes into account the erosion valleys or pits of the leading edge of an eroded turbine blade, may be taken. This measured chord length, which may reflect the chord length at the deepest valley or pit of erosion may represent the thinnest chord length in the area where the measurement is being taken. Thus, this measurement may be particularly relevant in determining the overall erosion level for the turbine blade 402.

The erosion gauge 100 may allow the operator to efficiently repeat the measurement process at multiple locations at regular intervals down each of the turbine blades 402. In this manner, a more complete picture of the erosion level for each of the turbine blades 402 and the turbine blade set as a whole may be determined. The turbine blade 402 may be pre-marked at the regular intervals where measurements are to be taken. The side of the sliding scale 112 that aligns horizontally with the valley insert 122 then may be aligned with the pre-marks so to ensure that the measurements occur at the desired location.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. An apparatus for taking measurements, comprising:
 a jaw comprising a lower jaw that includes a lower jaw surface and an upper jaw that includes an upper jaw surface such that the lower jaw surface and the upper jaw surface oppose each other;
 means for varying the distance between the lower jaw surface and the upper jaw surface;
 means for determining the distance between the lower jaw surface and the upper jaw surface; and
 wherein the lower jaw surface includes a valley insert.

2. The apparatus of claim 1, wherein the apparatus is sized to take measurements of a chord length of an installed turbine blade in a steam turbine.

3. The apparatus of claim 2, wherein the lower jaw and sliding scale comprise a thin profile such that the lower jaw and sliding scale may be inserted between assembled turbine blades.

4. The apparatus of claim 1, wherein the means for varying the distance between the lower jaw surface and the upper jaw surface comprises a sliding scale that connects the lower jaw to the upper jaw;
 wherein a first end of the sliding scale is fixed to the lower jaw and a second end of the sliding scale slides through the upper jaw such that the distance between the lower jaw surface and the upper jaw surface may be varied.

5. The apparatus of claim 4, wherein the means for determining the distance between the lower jaw surface and the upper jaw surface comprises an electronic depth gauge;
 wherein the electronic depth gauge is attached to the upper jaw; and
 wherein the sliding scale also slides through the electronic depth gauge.

6. The apparatus of claim 5, wherein the electronic depth gauge determines the distance between the lower jaw surface and the upper jaw surface by monitoring the movement of the sliding scale as the sliding scale slides through the electronic depth gauge.

7. The apparatus of claim 5, wherein the electronic depth gauge further comprises a display for displaying information including the measured distance between the lower jaw surface and the upper jaw surface; and
 wherein the display is positioned on the opposite side of the apparatus as the valley insert such that when the lower jaw is inserted between two assembled turbine blades from a downstream location in a turbine and the valley insert is inserted into an erosion valley on the leading edge of the turbine blade for the purpose of obtained a measurement, an operator of the apparatus is able to see the measurement reading on the display.

8. The apparatus of claim 4, wherein the upper jaw surface is substantially flat, substantially perpendicular to the sliding scale, and forms a shelf that is able to engage a trailing edge or leading edge of the turbine blade during the measurement of a chord length of the turbine blade.

9. The apparatus of claim 8, further comprising a zeroing standard;
 wherein the zeroing standard is a length of rigid material of a known length, the known length corresponding to the chord length of a turbine blade that has not experienced any erosion such that the zeroing standard may be placed between the upper jaw surface and the lower jaw surface for the purpose of zeroing the apparatus to the known length.

10. The apparatus of claim 9, wherein the lower jaw surface further includes a flat surface that opposes the flat surface of the upper jaw surface;
 wherein the flat surface of the lower jaw surface forms a shelf that is able to engage the zeroing standard during the zeroing of the apparatus; and
 wherein the flat surface of the lower jaw surface aligns vertically with the point of the valley insert.

11. The apparatus of claim 4, further comprising wings, the wings comprising extensions that extend outward from opposite sides of the upper jaw;
 wherein a lower edge of each of the wings is substantially perpendicular to the sliding scale.

12. The apparatus of claim 4, wherein the means for determining the distance between the lower jaw surface and the upper jaw surface comprises a plurality of markings positioned at regular intervals one of the sides of the sliding scale such that the alignment of the markings in relation to the upper jaw indicate the distance between the lower jaw surface and the upper jaw surface.

13. The apparatus of claim 1, wherein the valley insert comprises a narrow point; and
wherein the valley insert is oriented such that the point points substantially toward the upper jaw surface.

14. The apparatus of claim 13, wherein the valley insert comprises a wedge valley insert, the wedge valley insert comprising a wedge shaped piece that substantially narrows to the point.

15. The apparatus of claim 14, wherein the shape and size of the wedge shaped piece comprises the approximate shape and size of erosion valleys that occur on an eroded leading edge of a turbine blade in a steam turbine.

16. The apparatus of claim 13, wherein the valley insert comprises a pin valley insert, the pin valley insert comprising a long narrow pin piece that substantially narrows to the point.

17. The apparatus of claim 13, wherein the point of the valley insert aligns horizontally with a side of the sliding scale.

18. An erosion gauge for measuring a chord length of an eroded turbine blade in a steam turbine, comprising:
a jaw comprising a lower jaw that includes a lower jaw surface and an upper jaw that includes an upper jaw surface such that the lower jaw surface and the upper jaw surface oppose each other;
a sliding scale that connects the lower jaw to the upper jaw, wherein a first end of the sliding scale is fixed to the lower jaw and a second end of the sliding scale slides through the upper jaw such that the distance between the lower jaw surface and the upper jaw surface may be varied; and
an electronic depth gauge that determines the distance between the lower jaw surface and the upper jaw surface;
wherein the lower jaw surface includes a valley insert.

19. The apparatus of claim 18, wherein the valley insert comprises a narrow point; and
wherein the valley insert is oriented such that the point points substantially toward the upper jaw surface.

20. The erosion gauge of claim 19, wherein the valley insert comprises a wedge valley insert, the wedge valley insert comprising a wedge shaped piece that substantially narrows to the point.

* * * * *